United States Patent

Stockinger et al.

[11] Patent Number: 4,500,691
[45] Date of Patent: Feb. 19, 1985

[54] PHENOL-NOVOLAKS CONTAINING AMINO GROUPS

[75] Inventors: Friedrich Stockinger, Hölstein; Theobald Haug, Frenkdendorf, both of Switzerland

[73] Assignee: Ciba-Geigy Corporation, Ardsley, N.Y.

[21] Appl. No.: 568,685

[22] Filed: Jan. 6, 1984

[30] Foreign Application Priority Data

Jan. 13, 1983 [CH] Switzerland .............................. 173/83

[51] Int. Cl.³ .................... C08L 61/14; C08L 61/16; C08G 8/16; C08G 8/28
[52] U.S. Cl. .................... 525/503; 525/481; 525/491; 525/504; 525/502; 528/107; 528/127; 528/128; 528/162; 528/163; 528/154; 528/157; 428/436; 428/524
[58] Field of Search ............... 528/162, 163, 127, 128, 528/154, 157; 525/502, 503, 504

[56] References Cited

U.S. PATENT DOCUMENTS

| | | | |
|---|---|---|---|
| 2,934,511 | 4/1960 | Auerbach et al. | 525/504 X |
| 3,471,443 | 10/1969 | Bornstein | 525/503 |
| 3,558,559 | 1/1971 | LeBlanc | 528/162 X |
| 3,704,269 | 11/1972 | Freeman et al. | 528/153 X |
| 3,714,121 | 1/1973 | Kobel et al. | 528/107 |
| 3,773,721 | 11/1973 | Tiedeman | 525/503 X |
| 3,784,515 | 1/1974 | Freeman et al. | 525/503 X |
| 4,003,873 | 1/1977 | Smith | 528/129 |
| 4,101,500 | 7/1978 | Brodsky | 528/163 X |
| 4,195,151 | 3/1980 | Dunleavy et al. | 528/163 |
| 4,278,733 | 7/1981 | Benzinger | 525/490 X |
| 4,396,756 | 8/1983 | Baur et al. | 528/162 |

FOREIGN PATENT DOCUMENTS 2217099 9/1973 Fed. Rep. of Germany .

Primary Examiner—Howard E. Schain
Attorney, Agent, or Firm—Luther A. R. Hall

[57] ABSTRACT

Phenol-novolaks containing amino groups of formulas VI and VII

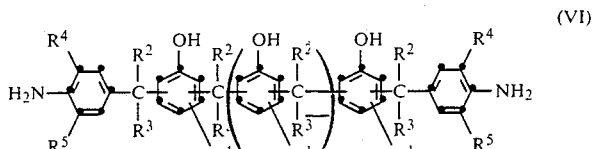

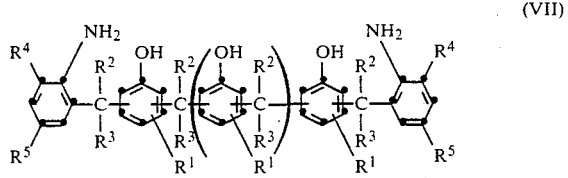

wherein $R^1$ is halogen, nitro, alkyl, alkoxy or phenyl, $R^2$ is hydrogen, alkyl, cycloalkyl, phenyl or furfuryl, $R^3$ is hydrogen or alkyl, $R^4$ and $R^5$ independently are alkyl, halogen, nitro or cyano, and x is 1 to 8, are obtained by reacting the corresponding phenol-novolak with an aldehyde or ketone of formula II

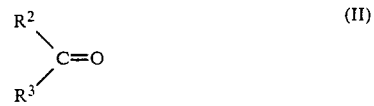

and with a substituted aniline of formula III or IV

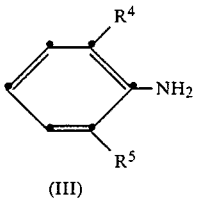 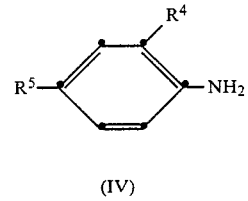

(III)            (IV)

in a molar ratio of 1 mol of phenol-novolak to 2 mols of compound of formula II and to 2 mols of compound of formula III or IV in an acid medium at a pH value of 0.5 to 3.0. The phenol-novolaks containing amino groups are useful curing agents for epoxy resins and are also suitable as starting compounds for the preparation of epoxy resins.

3 Claims, No Drawings

PHENOL-NOVOLAKS CONTAINING AMINO GROUPS

The present invention relates to novel condensates prepared in an acid medium from a substituted phenol, a di-substituted aniline and aldehydes or ketones, and processes for their preparation.

As is known, novolaks can also be used as curing agents for epoxy resins. It is also known that the properties of cured epoxy resins can be improved by using phenol/formaldehyde condensates modified with aromatic amines, preferably aniline, as curing agents.

The aniline-modified condensates of phenol and formaldehyde described in U.S. Pat. Nos. 3,714,121 and 4,278,733 as prepared in a neutral or basic medium and are thus resoles.

German Offenlegungsschrift No. 2,217,099 discloses, as an epoxy resin curing agent, certain aniline-modified condensates which are obtained by condensing aniline and phenol simultaneously with formaldehyde in a molar ratio of approximately 1:1:2, the condensation being carried out in the presence of alkaline or acid catalysts. The epoxy resins cured with such condensates have only low heat distortion points.

It has now been found that condensates prepared in an acid medium from subtituted phenol, disubstituted aniline and aldehydes or ketones are more useful curing agents for epoxy resins, since they can be processed more easily with epoxy resins and impart to the cured epoxy resins an improved resistance to chemicals.

The present invention thus relates to novel reaction products of substituted phenol, an aldehyde or ketone and substituted aniline, which can be obtained by reacting, in an aqueous, acid medium at a pH value of 0.5 to 3, $(x+2)$ mol of a substituted phenol of the formula I

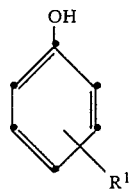

(I)

in which $R^1$ is bonded in the o- or p-position relative to the phenolic OH group and is a halogen atom, a nitro group, linear or branched alkyl having not more than 6 C atoms, alkylene having not more than 6 C atoms, alkoxy having not more than 6 C atoms or phenyl and x is zero or an average number of not more than 18, with $(x+2)$ mol of an aldehyde or ketone of the formula II

in which $R^2$ is a hydrogen atom, linear or branched alkyl having not more than 8 C atoms, cycloalkyl having 5 or 6 C atoms, phenyl or furfuryl and $R^3$ is a hydrogen atom or linear or branched alkyl having not more than 8 C atoms, and 1 mol of a substituted aniline of the formula III or IV

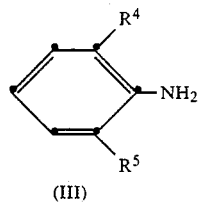 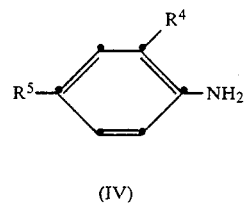

(III)                                  (IV)

in which $R^4$ and $R^5$ independently of one another are each linear or branched alkyl which has not more than 6 C atoms in the alkyl radical and is unsubstituted or substituted by halogen atoms, nitro or nitrile groups or alkoxy having not more than 4 C atoms, or a halogen atom or a nitro or nitrile group, up to $(x+3)$ mol of an aldehyde or ketone of the formula II and 2 mol of a substituted aniline of the formula III or IV, or by reacting 1 mol of a polynuclear substituted phenol of the formula V

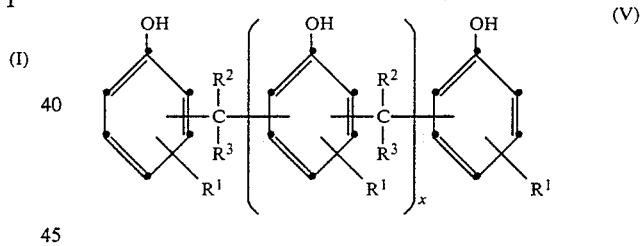

with 1 to 2 mol of an aldehyde or ketone of the formula II and 1 to 2 mol of a substituted aniline of the formula III or IV, the same molar amounts of aldehyde or ketone and substituted aniline being used here.

The present invention preferably relates to novel phenol-novolaks containing amino groups, of the formulae VI and VII

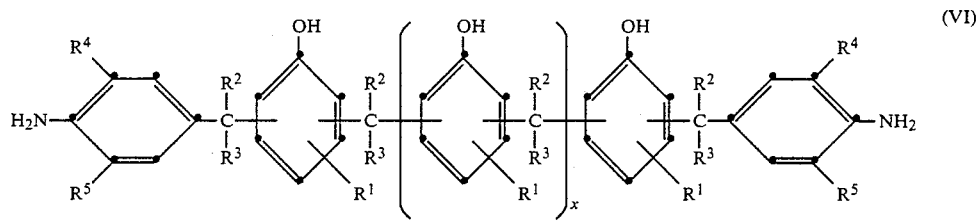

(VI)

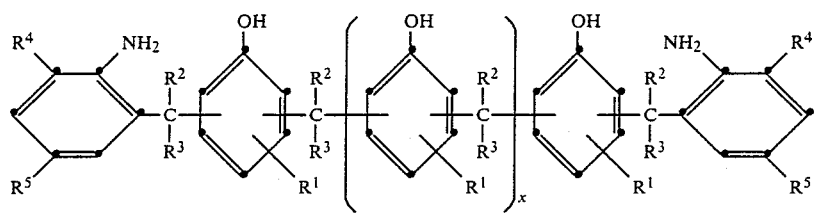

(VII)

in which $R^1$, $R^2$, $R^3$, $R^4$ and x are as defined above.

Preferably, in formula VI or VII, the radicals $R^1$ are each alkyl having not more than 4 C atoms, in particular methyl; the radicals $R^2$ are each a hydrogen atom; the radicals $R^3$ are each a hydrogen atom, phenyl or alkyl having 1 to 4 C atoms, in particular methyl or ethyl; the radicals $R^4$ and $R^5$ independently of one another are each linear or branched alkyl having not more than 4 C atoms and x has an average value of 1 to 8.

Preferably, and for the preparation of compounds of the formulae VI or VII, (x+2) mol of a substituted phenol of the formula I are reacted with (x+3) mol of an aldehyde or ketone of the formula II and 2 mol of a substituted aniline of the formula III or IV, or 1 mol of a polynuclear phenol of the formula V is reacted with 2 mol of an aldehyde or ketone of the formula II and 2 mol of a substituted aniline of the formula III or IV.

Preferably, for the preparation of compounds of the formulae VI and VII according to the invention, polynuclear, substituted, polyhydric phenols of the formula V are used as the starting substances, especially those in which the radicals $R^1$ are each alkyl having not more than 4 C atoms, the radicals $R^2$ are each a hydrogen atom, the radicals $R^3$ are each a hydrogen atom, phenyl or alkyl having 1 to 4 C atoms, in particular methyl or ethyl and x has an average value of 1 to 8.

This process is advantageously carried out by initially introducing the phenol of the formula I or V into the reaction vessel with the aniline of the formula III or IV, adjusting the reaction solution to a pH value of 0.5 to 3 with an aliphatic carboxylic acid or a mineral acid and adding the aldehyde or ketone dropwise, preferably in a slight molar excess, while stirring and heating the starting substances initially introduced.

Formic acid, acetic acid, oxalic acid, hydrochloric acid or sulfuric acid is preferably used for the preparation of the acid reaction medium. The process is moreover in general carried out at reaction temperatures of 60° to 120° C., preferably at between 80° and 100° C.

After neutralisation of the reaction mixture with a 30–50% alkali metal hydroxide solution, the reaction mixture is worked up by subsequent washing out of the water-soluble constituents with hot water. Additional purification can be achieved by dissolving the reaction product in a water-soluble organic solvent, introducing the solution into water, with vigorous stirring, and precipitating the product in this manner. After filtration, the residue is dried at 20° to 50° C. in vacuo.

The starting substances of the formulae I to V are known compounds, and some of them are commercially available.

p-Chlorophenol, o-bromophenol, o-cresol, o-allylphenol, 2-propenylphenol, p-nonylphenol, o-methoxyphenol, o-ethoxyphenol, p-nitrophenol or p-phenylphenol, for example, can be used as the compound of the formula I.

Examples of suitable compounds of the formula II are formaldehyde, acetaldehyde, propionaldehyde, benzaldehyde, furfural, acetone, diethyl ketone, acetophenone and benzophenone.

Examples of compounds which are suitable disubstituted anilines of the formulae III and IV are 2,6-diethylaniline, 2-isopropyl-6-methylaniline, 2,4-dimethylaniline, 2-methyl-4-nitraniline, 2-chloro-4-nitraniline, 2-cyano-4-nitraniline, 2,6-dichloroaniline, 2,4-dinitraniline, 4-chloro-2-methylaniline, 2-bromo-4-nitraniline and 2-trifluoromethyl-4-chloroaniline.

The polynuclear substituted phenols of the formula VII, such as, for example, 2,2-bis-(3-methyl-4-hydroxyphenyl)-propane, 2,2-bis-3-chloromethyl-4-hydroxyphenyl)-propane, bis-(3-tert.butyl-4-hydroxyphenyl)-methane and bis-(3-allyl-4-hydroxyphenyl)-methane, or the commercially available cresol-novolaks can be prepared in a known manner by reacting the phenol of the formula III substituted by $R^1$ with the aldehydes or ketones of the formula IV to give the bisphenols or the novolaks.

As mentioned above, the reaction products according to the invention, especially the phenol-novolaks containing amino groups, of the formulae VI and VII, are useful curing agents for epoxy resins, and they can be employed for curing all types of epoxy resins, such as compounds containing glycidyl groups or cycloaliphatic epoxide compounds with an epoxide group bonded in the cycloaliphatic ring.

The phenol-novolaks of the formulae VI and VII according to the invention are also suitable starting substances for the preparation of epoxy resins, which can be obtained by glycidylation of the compounds according to the invention.

EXAMPLE 1

149.2 g (1.0 mol) of 2,6-diethylaniline, 368.4 g of an industrially prepared o-cresol/formaldehyde novolak (average molecular weight Mn=714; OH equivalent weight=122.8) and 107.9 g of 50% aqueous sulfuric acid (0.55 mol) are initially introduced into a 4.5 liter sulfonating flask equipped with a stainless steel anchor-type stirrer, a thermometer, a reflux condenser and a dropping funnel, and 101.5 g of 37% aqueous formaldehyde (1.25 mol) are added dropwise, while stirring and heating, at a temperature of 82°–90° C. in the course of 11 minutes. The reaction mixture is left to react at the boiling point for 4 hours and 24 minutes and is then neutralised with 123.4 g of 50% aqueous potassium hydroxide (1.1 mol), the aqueous phase is decanted off, 1 liter of boiling water is added and the reaction mixture is stirred for 10 minutes and decanted off, and the process is repeated 6 times. After the water-soluble constituents have been washed out, the reaction mixture is dissolved in 1.5 liters of acetone, the solution is filtered and the filtrate is introduced into 24 liters of ice-water, which is thoroughly mixed with a turbo stirrer. The precipitated product is filtered off, washed with water and then dried at 50° C. in vacuo.

518.6 g of a beige pulverulent novolak with a nitrogen content of 2.36% are obtained. The Kofler softening point is 100° C. The resulting product has the following structural formula:

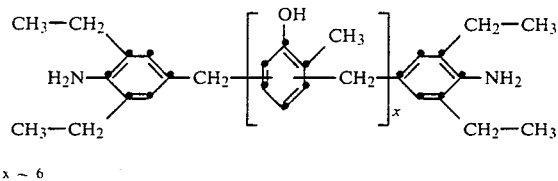

x ~ 6

EXAMPLE 2

59.7 g (0.4 mol) of 2,6-diethylaniline, 147.4 g of an industrially prepared o-cresol/formaldehyde novolak (average molecular weight $\overline{M}n=714$; OH equivalent weight=122.8), 19.8 g (0.22 mol) of oxalic acid and 40.6 g of 37% aqueous formaldehyde (0.50 mol) are reacted according to Example 1 and the mixture is neutralised with 49.4 g of 50% aqueous potassium hydroxide solution (0.44 mol) and then worked up analogously to Example 1.

204.9 g of a brownish novolak which contains 2.52% of nitrogen and has a Kofler softening point of 94° C. are obtained. The resulting product has the following structural formula:

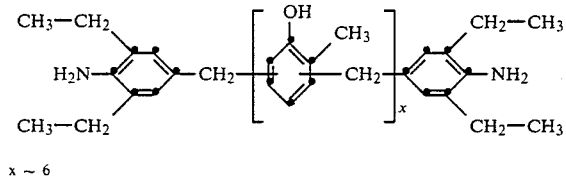

x ~ 6

EXAMPLE 3

298.5 g (2.0 mol) of 2-isopropyl-6-methylaniline, 491.2 g of an industrially prepared o-cresol/formaldehyde novolak (average molecular weight $\overline{M}n=714$; OH equivalent weight=122.8), 202.9 g of 37% aqueous formaldehyde (2.5 mol) and 215.8 g of 50% sulfuric acid (1.1 mol) are reacted at 130°–135° C. for 4 hours and 15 minutes analogously to Example 1 and the mixture is neutralised with 246.9 g of 50% potassium hydroxide solution (2.2 mol) and worked up as described in Example 1. 775.8 g of a yellowish powder which has a Kofler softening point of 114° C. are obtained. The nitrogen content of the reaction product is 3.19%.

EXAMPLE 4

242.4 g (2.0 mol) of 2,4-dimethylaniline, 491.2 g of an industrially prepared o-cresol/formaldehyde novolak (average molecular weight $\overline{M}n=714$; OH equivalent weight=122.8), 215.8 g of 50% sulfuric acid (1.1 mol) and 202.9 g of 37% formaldehyde (2.5 mol) are reacted for 4 hours and 40 minutes analogously to Example 1 and, after neutralisation with 246.8 g of 50% potassium hydroxide solution (2.2 mol), the product is purified and isolated, according to Example 1. The yield is 689.8 g. The reaction product has a Kofler softening point of 98° C. and contains 3.24% of nitrogen.

Use examples

EXAMPLE I 162 g of 1,1,2,2-tetra-(p-glycidyloxyphenyl)-ethane, 275 g of tetrabromobisphenol A diglycidyl ether (average epoxide content 2.75 equivalents/kg), 143 g of a bisphenol A diglycidyl ether prelengthened with tetrabromobisphenol A by the advancement method (average bromine content 21 percent by weight, epoxide content 2.1 equivalents/kg) and 272 g of the novolak according to Example 1 are dissolved together in 500 g of methyl ethyl ketone. In order to achieve shorter processing times, addition of 3.0 g of phenylimidazole is recommended. Glass fabric is impregnated with this solution and is then dried at 140° C. A so-called prepreg is formed. In each case 8 layers of this prepreg are pressed at 170° C. under a pressure of $29.4 \times 10^4$ Pa for 2 hours, a laminated sheet being formed. After exposure of laminated samples (5×5 cm) to the vapour of boiling trichloroethylene for 2 minutes, their weight increase is only 0.05%.

The same change in weight is found if no 2-phenylimidazole is used. Trichloroethylene is a solvent frequently used in the printed circuit board industry. It is therefore important that as little as possible thereof is absorbed.

EXAMPLE II 144 g of 1,1,2,2-tetra-(p-glycidyloxyphenyl)-ethane, 259 g tetrabromobisphenol A diglycidyl ether (average epoxide content 2.75 equivalents/kg) and 300 g of the novolak according to Example 4 are dissolved together in 484 g of methylglycol. Glass fabric is impregnated with this solution and is then dried at 170° C. a so-called prepreg being formed. In each case 8 layers of this prepreg are pressed at 170° C. under a pressure of $29 \times 10^4$ Pa for 2 hours, laminated sheets being formed. After exposure of laminated samples (5×5 cm) to the vapour of boiling trichloroethylene for 2 minutes, their weight increase is only 0.09%.

What is claimed is:

1. A phenol-novolak, containing amino groups, having the formula VI or VII

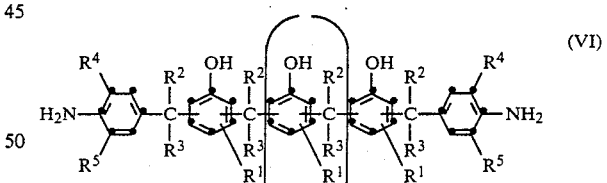

(VI)

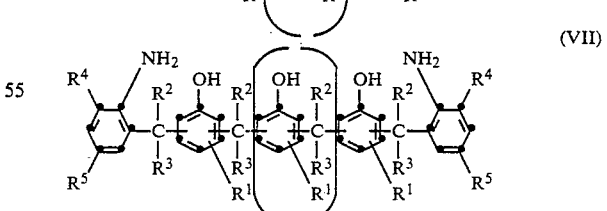

(VII)

in which $R^1$ is bonded in the o- or position relative to the phenolic OH group and is a halogen atom, a nitro group, linear or branched alkyl having not more than 6 C atoms, alkoxy having not more than 6 C atoms or phenyl, $R^2$ is a hydrogen atom, linear or branched alkyl having not more than 8 C atoms, cycloalkyl having 5 or 6 C atoms, phenyl or furfuryl, $R^3$ is a hydrogen atom or linear or branched alkyl having not more than 8 C atoms, $R^4$ and $R^5$ independently of one another are each linear or branched alkyl which has not more than 6 C atoms in the alkyl radical and is unsubstituted or substituted by halogen atoms, nitro or cyano groups or alkoxy having not more than 4 C atoms, or a halogen atom or a nitro or cyano group, and x has an average value from 1 to 8.

2. A phenol-novolak according to claim 1, of the formula VI or VII, in which the radicals $R^1$ are each alkyl having not more than 4 C atoms, the radicals $R^3$ are each a hydrogen atom, the radicals $R^2$ are each a hydrogen atom, phenyl or alkyl having 1 to 4 C atoms, the radicals $R^4$ and $R^5$ independently of one another are each linear or branched alkyl having not more than 4 C atoms and x has an average value from 1 to 8.

3. A process for preparing a phenol-novolak, containing amino groups, having the formula VI or VII

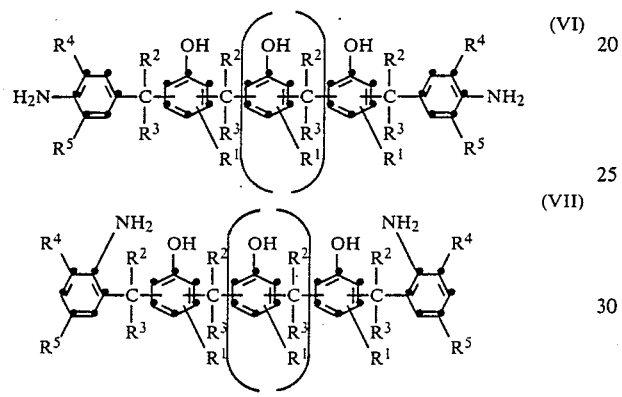

in which $R^1$ is bonded in the o- or p-position relative to the phenolic OH group and is a halogen atom, a nitro group, linear or branched alkyl having not more than 6 C atoms, alkoxy having not more than 6 C atoms or phenyl, $R^2$ is a hydrogen atom, linear or branched alkyl having not more than 8 C atoms, cycloalkyl having 5 or 6 C atoms, phenyl or furfuryl, $R^3$ is hydrogen atom or linear or branched alkyl having not more than 8 C atoms, $R^4$ and $R^5$ independently of one another are each linear or branched alkyl which has not more than 6 C atoms in the alkyl radical and is unsubstituted or substituted by halogen atoms, nitro or cyano groups or alkoxy having not more than 4 C atoms, or a halogen atom or a nitro or cyano group, and x has an average value from 1 to 8, which comprises reacting, in an aqueous, acid medium at a pH value of 0.5 to 3, a phenol-novolak of formula V

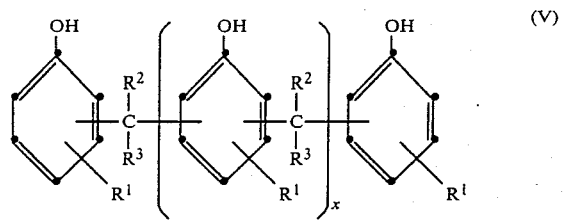

with an aldehyde or ketone of formula II

and with a substituted aniline of formula III or IV

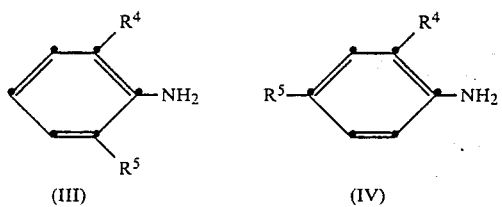

wherein $R^1$, $R^2$, $R^3$, $R^4$ and x are as defined above, in a molar ratio of 1 mol of phenol-novolak of formula V to 2 mols of an aldehyde or ketone of formula II and 1 to 2 mols of a substituted aniline of formula III or IV.

* * * * *

UNITED STATES PATENT AND TRADEMARK OFFICE
CERTIFICATE OF CORRECTION

PATENT NO. : 4,500,691

DATED : February 19, 1985

INVENTOR(S) : Friedrich Stockinger and Theobald Haug

It is certified that error appears in the above-identified patent and that said Letters Patent is hereby corrected as shown below:

Claim 1, Column 6, Line 61 should read-- in which $R^1$ is bonded in the o-or p-position relative to--.

Claim 3, Column 8, Line 42 should read-- formula II and to 2 mols of a substituted aniline of --.

Signed and Sealed this

Twenty-ninth Day of October 1985

[SEAL]

Attest:

DONALD J. QUIGG

Attesting Officer

Commissioner of Patents and
Trademarks—Designate